United States Patent Office 3,450,708
Patented June 17, 1969

3,450,708
4-ACETYL-5,5-DIMETHYL-2-(5-NITRO-2-FURYL)-Δ²-1,3,4-OXADIAZOLINE
Homer Albert Burch, Norwich, N.Y., assignor to The Norwich Pharmacal Company, a corporation of New York
No Drawing. Filed June 30, 1967, Ser. No. 650,249
Int. Cl. C07d 99/02; A61k 27/00
U.S. Cl. 260—307                                    1 Claim

ABSTRACT OF THE DISCLOSURE

A chemical compound, 4-acetyl-5,5-dimethyl-2-(5-nitro-2-furyl)-Δ²-1,3,4-oxadiazoline, is effective in ridding mice of *Trichomonas foetus* infection when administered perorally.

---

This invention relates to a chemical compound 4-acetyl-5,5-dimethyl-2-(5-nitro-2-furyl)-Δ²-1,3,4-oxadiazoline of the formula:

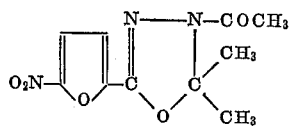

and to compositions containing it as well as a method for the preparation and use thereof.

The compound of this invention is distinguished by its ability to counteract *Trichomonas foetus* infection. Thus, when administered perorally in doses of from 15–30 mg./kg. to mice infected with this parasite, attenuation of its adverse effects is secured.

The method which is currently preferred for the preparation of the compound of this invention consists in treating 5-nitro-2-furoic acid isopropylidenehydrazide, easily secured from the reaction of acetone with 5-nitro-2-furoyl hydrazide, with acetic anhydride, advantageously under the influence of heat. Such a method is typical of the cyclization variety whereby ring compounds are prepared.

The compound of this invention is readily compounded in formulations adapted for its convenient administration such as capsules, tablets, lozenges, pastilles and the like using excipients and adjuvants known to the pharmaceutical art.

In order that the compound of this invention may be readily available to those skilled in the art, its synthesis is set forth:

A solution of 42.9 g. (0.20 mole) of 5-nitro-2-furoic acid isopropylidenehydrazide in 150 ml. of acetic anhydride is refluxed for one hour. The cooled reaction mixture is poured over 1 kg. of cracked ice and stirred vigorously until crystallization occurs. When crystallization does not take place readily, solid sodium carbonate is added until the reaction mixture is neutral. The solid product is collected and recrystallized from ca. 500 ml. of ethanol. The product separates as short, bright yellow needles melting at 125–130° in a yield of 31.1 g. (60.5%). Additional recrystallization raises the M.P. to 127.5–128.5°.

*Analysis.*—Calcd. for $C_{10}H_{11}N_3O_5$: C, 47.43; H, 4.38; N, 16.60. Found: C, 47.09; H, 4.23; N, 16.49.

What is claimed is:
1. The compound 4-acetyl-5,5-dimethyl-2-(5-nitro-2-furyl)-Δ²-1,3,4-oxadiazoline.

References Cited

Yale et al.: J. Am. Chem. Soc., vol. 75, pp. 1933–1942 (1953).

ALTON D. ROLLINS, *Primary Examiner.*

U.S. Cl. X.R.
260—347.3, 999